United States Patent [19]

Keller

[11] Patent Number: 5,093,080
[45] Date of Patent: Mar. 3, 1992

[54] CONSERVATION PROCESS FOR AGRICULTURAL PRODUCTS

[76] Inventor: Elbert G. Keller, 3260 W. Telegraph Rd., Fillmore, Calif. 93015

[21] Appl. No.: 432,078

[22] Filed: Nov. 6, 1989

[51] Int. Cl.$^5$ .................. B01J 3/03; G05D 22/00; A01L 9/00; A23K 3/445
[52] U.S. Cl. .................................. 422/40; 422/42; 422/43; 422/112; 422/295; 426/419
[58] Field of Search ............... 422/40, 42, 43, 112, 422/110, 295, 1; 426/419

[56] References Cited

U.S. PATENT DOCUMENTS

| | | | |
|---|---|---|---|
| 2,095,455 | 10/1937 | Simonson | 99/271 |
| 2,483,064 | 9/1949 | Reich | 62/170 |
| 3,400,650 | 9/1968 | Burg | 99/271 |
| 3,415,310 | 12/1968 | Kuhlmann | 165/27 |
| 3,937,847 | 2/1976 | Elkins et al. | 426/231 |
| 3,958,028 | 5/1976 | Burg | 426/418 |
| 4,066,401 | 1/1978 | Solomon | 21/61 |
| 4,287,152 | 9/1981 | Hoover et al. | 422/40 |
| 4,411,918 | 10/1983 | Cimino et al. | 426/124 |
| 4,627,336 | 12/1986 | Nam | 99/467 |
| 4,679,350 | 7/1987 | Bantu | 47/29 |
| 4,961,322 | 10/1990 | Oguma et al. | 426/419 |

OTHER PUBLICATIONS

Chemical Engineers Handbook, Defn of Pressure {Gage & Absolute}.

Primary Examiner—Robert J. Hill, Jr.
Assistant Examiner—Abanti B. Singla

[57] ABSTRACT

A preservation process and apparatus which serves to preserve respiratory agricultural produces, such as plants, flowers, fruits, vegetables, cereal grain and the like, without necessitating the use of chemical coatings, chemical preservatives, fumigants, or the like. The invention is predicated on the concept of imposing a small positive pressure gradient on the product from the outside to the inside. The selected positive pressure gradient may be of the order of 1–5 psi, which is sufficient to insure positive partial vapor pressure gradients from ambient partial vapor pressure to the internal partial vapor pressure of the product. Such a positive pressure sufficient to ensure a positive partial pressure gradient neutralizes the outward diffusion of moisture and nutrients from the product, and it also retards the respiration rate and thus retards its rated maturity.

3 Claims, 2 Drawing Sheets

CONSERVATION PROCESS FOR AGRICULTURAL PRODUCTS

BACKGROUND OF THE INVENTION

Agricultural products such as plants, fruits, vegetables, cereal grains, in the pre-harvest era, assimilate carbon dioxide, water and other chemicals producing plant structure. These nutrients are energy sources for all living organisms. This process (photosynthesis) also release oxygen into the atmosphere. Plant cells, in both the pre-harvest and post-harvest eras, like animal cells, respire. Cellular respiration described a sequence of chemical reactions wherein oxygen is used in the breakdown of glucose, generating energy (manifested as heat) and exhaling carbon dioxide. The skin or outer surface of the product is a porous barrier through which it breathes. Inside the barrier the humidity is almost 100%, while outside the barrier the ambient humidity is generally lower. This humidity gradient causes a partial vapor pressure gradient from inside the product to the outside, forcing water, oxygen and nutrients to leave the product resulting in drying and early death of the product.

The present invention is predicated on the hypothesis that an inverse relation between respiration rate and pressure exists similar to the direct relation of respiration rates and temperature. Others in the prior art have established that the rate of cellular maturity is a direct function of respiration rate. Thus, for a given temperature, an increase in pressure will retard respiration. However, elevated pressure do not mitigate the effects of temperature but merely superimpose a negative effect bias. However, it should be pointed out that elevated pressures in accordance with the present invention will not offset the effect of elevated temperatures. Conversely, elevated pressures as taught by the present invention in concert with depressed temperatures will serve to augment one another.

In the practice of the present invention, in one of its embodiments, a small positive pressure is imposed on the atmosphere surrounding the product which is sufficient to insure a positive partial vapor pressure gradient from ambient pressure to the internal partial vapor pressure. Such a positive pressure gradient neutralizes the outward diffusion of moisture and nutrients.

Accordingly, one objective of the present invention is to provide a means for preserving agricultural products such as fruits and vegetables, and including cereal grains, without the application of wraps, chemical coatings, chemical preservatives, or fumigants. As mentioned above, the process of the invention may be used independently of, or in conjunction with depressed temperatures.

Any respiratory agricultural product may be preserved at any state from growth through harvest and storage for extended periods of time, by utilizing the teachings of the present invention; specifically by imposing a small positive pressure on the atmosphere surrounding the product, typically about 1-5 psi, sufficient to insure positive partial vapor pressure gradients from ambient pressure to internal partial vapor pressure.

The concept of the invention may be applied both to fixed pressure systems, including plastic bags, metal or plastic containers, and the like, for the household consumer; as well as computerized servo-control systems which monitor and regulate the pressure and gaseous constituents so as to compensate for varying ambient parameters including synthetically imposed depressed temperatures. Transients in ambient parameters adversely affect the partial vapor pressure gradients, and the servo-control system may also provide for modifying, on a time oriented basis, inert gaseous constituents for control and/or eradication of undesirable bacteria and organisms, such control being enhanced when the inert gases are pressurized.

It should also be noted that during the transient period of depressing temperature the negative partial vapor pressure gradient is aggravated. Thus, if ambient temperatures fluctuate (imposed if depressed temperatures are employed) then the resultant fluctuations in pressure gradients can be eliminated by controlling the magnitude of the elevated pressure. Similarly, the pressure gradients are aggravated when the agricultural products are subjected to reduced barometric pressures when transported over mountains, for example. Again, to offset these adverse effects the controlled pressures provided by the system of the present invention should be elevated.

As pointed out above, in order to optimize all of the desired parameters in a commercial system incorporating the concepts of the invention, monitoring and servo-control are required. Current technology employing waxes, wraps, depressed temperatures, and the like, partially addresses some of the parameters. Any one of the aggregate of the prevailing state of the art technology effects, once applied, are fixed. This includes the current employment of depressed temperatures. One of the cardinal improvements of the controlled environment concept of the present invention is the fact that it need not be a fixed control, but a servo-controlled environment employing monitoring sensors feeding a computerized control system.

The process and system of the invention is not intended to be a replacement for refrigeration. However, the system and process of the invention accomplishes much more than mere refrigeration, since it effectively seals into the product all of the constituents in the product, and achieves this without destruction to cellular health or without requiring the use of chemicals.

SUMMARY OF THE INVENTION

The invention provides a preservation method and apparatus for respiratory agricultural products, such as plants, flowers, fruits, vegetables, cereal grains, and the like, which comprises imposing a small positive pressure on the atmosphere surrounding the product so as to create a positive partial vapor pressure gradient from ambient pressure to the internal partial vapor pressure of the product in order to neutralize the outward diffusion of moisture and nutrients from the product.

DETAILED DESCRIPTION OF THE ILLUSTRATED EMBODIMENTS

Figure 1:
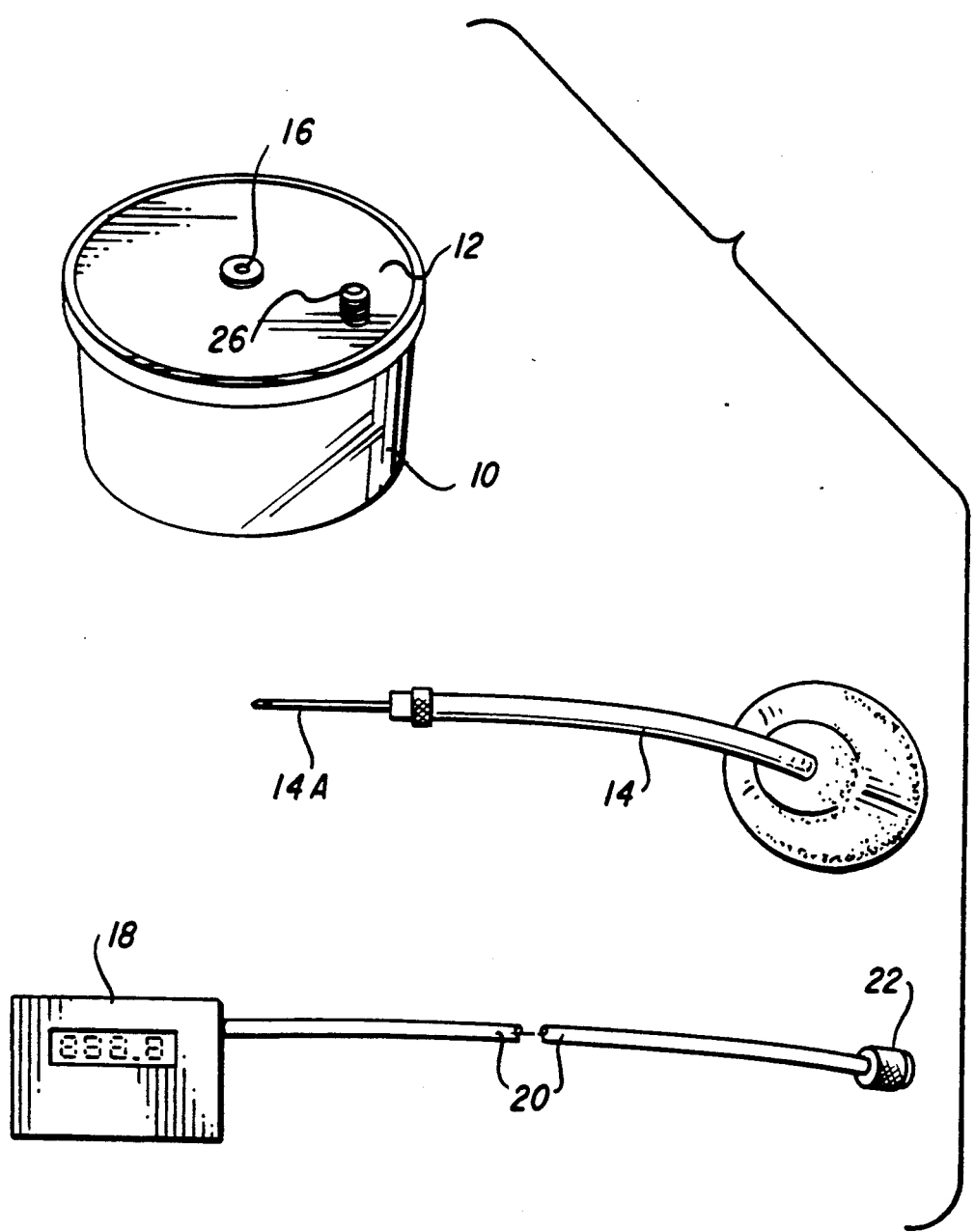
FIG. 1 is a representation of one embodiment of a fixed pressure apparatus which may be used, for example, by the household consumer, in the practice of the present invention.

The apparatus of FIG. 1 includes a container 10, which is sealed by a removable cover 12. In the practice of the invention, the particular agricultural product to be preserved is placed in the container 10, and the container is then sealed by closing it with the cover 12.

Pressurized air is introduced into the interior of container 10 by means of a small hand pump 14 equipped with a needle valve 14A. Needle valve 14A fits into a one-way valve 16 in cover 10. A read-out module 18 is attached to a tube 20 having a coupling 22 at its distal end. Coupling 22 may be attached to a bushing 26 in cover 12. Module 18 provides a means for monitoring internal pressures in container 10. The module is removable from the cover 12 to facilitate cleaning of the cover and of container 10.

A fixed positive pressure of the order 1-5 psi is thereby maintained within the container so as to provide a positive partial vapor pressure within the container to the internal partial vapor pressure of the product stored in the container. This positive partial vapor pressure serves to neutralize the outward diffusion of moisture and nutrients from the product.

As stated above, although the container shown in FIG. 1 is a rigid plastic container, it may also take the form, for example, of a mason jar, plastic bag, a metal container, a store display case, or the like.

Figure 2:
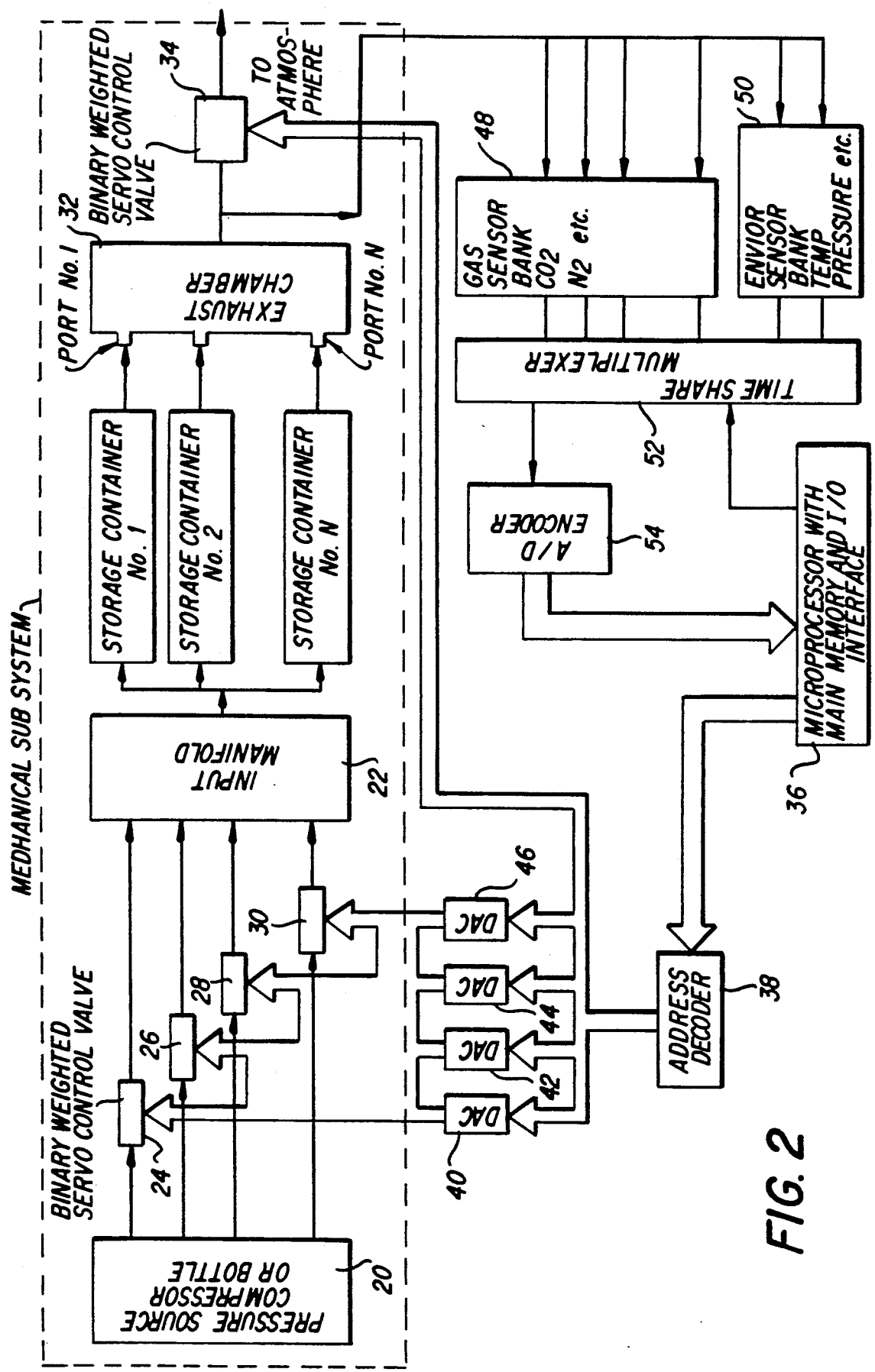
FIG. 2 is a block diagram showing a commercial system incorporating the apparatus of the invention, and providing for the regulation of ambient pressure in accordance with changes in various ambient parameters.

The system shown in FIG. 2 is a commercial version which constitutes a computerized servo-control system which monitors and regulates the pressure within, for example, a number of storage containers designated Nos. 1-N so as to compensate for varying ambient parameters.

The system in FIG. 2 includes a pressure source 20 which may, for example, be a usual compressor or bottle of pressurized fluid. Source 20 is coupled to an input manifold 22 through independent lines, each containing a binary weighted servo control valve, such as valves 24, 26, 28 and 30. The output of the input manifold 22 is coupled to the storage containers Nos. 1-N. The outlets from the storage containers are all connected to an exhaust chamber 32 which in turn is connected through a binary weighted servo control valve 34 to the atmosphere.

The system of FIG. 2 is controlled by a microprocessor 36 which is coupled to the various valves 24, 26, 28 30 and 34 through an address decoder 38 and through a number of digital-analog converters such as converters 40, 42, 44 and 46.

A number of gas sensors designated by block 48 are coupled to the interior of the exhaust chamber 32 to sense the presence of various gases within the containers. An additional number of sensors 50 are provided for sensing ambient environmental parameters. The various sensors represented by the blocks 48 and 50 generate control signals which are multiplexed in a multiplexer 52 and fed to the microprocessor 36 on a time-shared basis through an analog-digital encoder represented by block 54.

The various elements shown in FIG. 2, and the overall operation of these elements is believed to be sufficiently well known so that a detailed description of the individual elements, and their interrelation with one another need not be described in precise detail.

Specifically, the microprocessor 36 responds to the multiplexed signals from sensors 48 and 50 to provide appropriate controls to the control valves 24, 26, 28 and 30 so that appropriate pressures are maintained in the storage containers when changing ambient conditions require an increase in internal pressure. Likewise, the microprocessor supplies an appropriate control to valve 34 to regulate the internal pressure of the containers when the ambient conditions call for a decrease in pressure.

The invention provides, therefore, an improved process and apparatus for regulating pressure differentials with respect to agricultural products so as to preserve the products and to protect the products from contaminants, without the resort to the prior art expedients.

It will be appreciated that while particular embodiments of the invention have been shown and described, modifications may be made. It is intended in the claims to cover all such modifications which fall within the true spirit and scope of the invention.

I claim:

1. A method for preserving a respiratory agricultural product having a particular internal partial vapor pressure which comprises introducing air pressurized to a positive pressure with respect to ambient pressure to an enclosed area surrounding the produce thereby providing a positive pressure gradient from ambient pressure to the internal vapor pressure of the product to negate the outward diffusion of moisture and nutrients of the products.

2. The method defined in claim 1, in which said positive pressure of said pressurized air is of the order of 1-5 psi.

3. The method defined in claim 1, and which includes the additional step of regulating said positive pressure of said pressurized air in response to changes in ambient temperature and pressure.

* * * * *

REEXAMINATION CERTIFICATE (2459th)
United States Patent [19]
Keller

[11] B1 5,093,080
[45] Certificate Issued Jan. 24, 1995

[54] CONSERVATION PROCESS FOR AGRICULTURAL PRODUCTS

[75] Inventor: Elbert G. Keller, Fillmore, Calif.

[73] Assignee: P C P Partnership

Reexamination Request:
No. 90/002,974, Jan. 25, 1993

Reexamination Certificate for:
Patent No.: 5,093,080
Issued: Mar. 3, 1992
Appl. No.: 432,078
Filed: Nov. 6, 1989

[51] Int. Cl.⁶ .................. B01J 3/03; G05D 22/00; A01L 9/00; A23K 3/00
[52] U.S. Cl. .................. 422/40; 422/42; 422/43; 422/112; 422/295; 426/419
[58] Field of Search .......... 422/40, 42, 43, 1, 110, 422/112, 295; 426/419

[56] References Cited
U.S. PATENT DOCUMENTS
2,994,424  8/1961  Selby et al. .
3,958,028  5/1976  Burg .
4,627,336  12/1986  Nam .
4,961,322  10/1990  Oguma et al. .

FOREIGN PATENT DOCUMENTS
710979  7/1954  United Kingdom .

*Primary Examiner*—Timothy M. McMahon

[57] ABSTRACT

A preservation process and apparatus which serves to preserve respiratory agricultural produces, such as plants, flowers, fruits, vegetables, cereal grain and the like, without necessitating the use of chemical coatings, chemical preservatives, fumigants, or the like. The invention is predicated on the concept of imposing a small positive pressure gradient on the product from the outside to the inside. The selected positive pressure gradient may be of the order of 1–5 psi, which is sufficient to insure positive partial vapor pressure gradients from ambient partial vapor pressure to the internal partial vapor pressure of the product. Such a positive pressure sufficient to ensure a positive partial pressure gradient neutralizes the outward diffusion of moisture and nutrients from the product, and it also retards the respiration rate and thus retards its rated maturity.

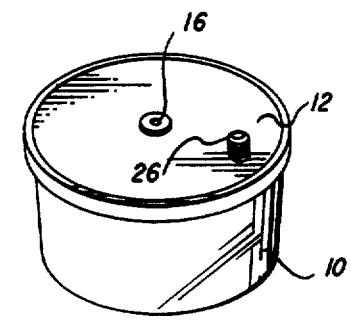

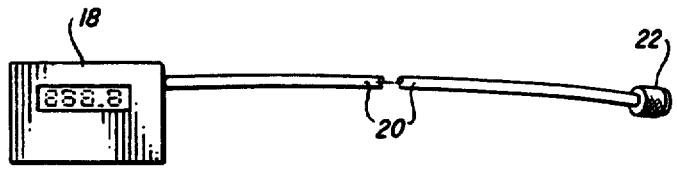

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

Claims 1-3 are cancelled.

* * * * *